(12) United States Patent
Qiu et al.

(10) Patent No.: US 10,624,159 B2
(45) Date of Patent: Apr. 14, 2020

(54) DRIVER WITH AT LEAST FOUR DIFFERENT STATES

(71) Applicant: PHILIPS LIGHTING HOLDING B.V., Eindhoven (NL)

(72) Inventors: Yifeng Qiu, Eindhoven (NL); Pieter Gerrit Blanken, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/557,558

(22) PCT Filed: Mar. 1, 2016

(86) PCT No.: PCT/EP2016/054299
§ 371 (c)(1),
(2) Date: Sep. 12, 2017

(87) PCT Pub. No.: WO2016/146375
PCT Pub. Date: Sep. 22, 2016

(65) Prior Publication Data
US 2018/0049282 A1    Feb. 15, 2018

(30) Foreign Application Priority Data
Mar. 17, 2015  (EP) .................................... 15159318

(51) Int. Cl.
*H05B 33/08*  (2006.01)
*H02J 7/00*  (2006.01)
*H05B 37/02*  (2006.01)

(52) U.S. Cl.
CPC ........ *H05B 33/0809* (2013.01); *H02J 7/0068* (2013.01); *H05B 33/0806* (2013.01); *H05B 33/0842* (2013.01); *H05B 37/02* (2013.01)

(58) Field of Classification Search
CPC .................................... H05B 33/08; H05B 33/0842; H05B 33/0815; H02J 7/00; H02J 7/0068;
(Continued)

(56) References Cited

U.S. PATENT DOCUMENTS 6,989,807 B2    1/2006  Chiang
8,076,920 B1 *  12/2011  Melanson ........... H02M 1/4208
                                                      315/247
(Continued)

FOREIGN PATENT DOCUMENTS

CN    201513122 A    8/2009
CN    102362550 A    2/2012
(Continued)

OTHER PUBLICATIONS

Seoul Semiconductor, Technical Workbook for AIC, Rev.03, L.4 Divison, Sep. 2013.
(Continued)

*Primary Examiner* — Fritz M Fleming
*Assistant Examiner* — Jagdeep S Dhillon
(74) *Attorney, Agent, or Firm* — Daniel J. Piotrowski

(57) ABSTRACT

Drivers (1-10) for driving load circuits (100) comprise supply circuits (1) for providing supply current signals from a mains source to the load circuits (100), storage circuits (2) for storing energy destined for the load circuits (100), and switch circuits (3-8) coupled with the storage circuit (2), the load circuit (100) and the supply circuit (1), and for switching the coupling among the storage circuits (2), the load circuit (100) and the supply circuit (1). The switched storage circuits (2) can, in charge states, be charged via the supply current signals, and in bypass states be bypassed, and in dependent discharge states be discharged via the load circuit (100) together with the supply current signals, and in independent discharge states be discharged via the load circuits (Continued)

(100) independently from the supply current signals for a substantial time duration. The drivers (1-10) may further comprise controllers (10) for controlling the switch circuits (3-8) for bringing the drivers (1-10) between two subsequent zero-crossings of signals supplied to the supply circuits (1) into the independent discharge state, the dependent discharge state, the bypass state, the charge state, the bypass state, the dependent discharge state and the independent discharge state, in this particular order. These drivers (1-10) show a reduced total harmonic distortion.

15 Claims, 5 Drawing Sheets

(58) Field of Classification Search
CPC . H02J 7/0072; H02J 9/06; H02J 9/061; G06F 1/30; G06F 1/28; B60W 10/08; B60W 10/30; B60W 20/00; B60L 11/00; B60L 11/005; B60L 11/18; G05F 5/00
USPC ....... 307/80, 9.1, 26; 363/16, 15, 44, 74, 78, 363/79; 323/299, 297; 320/137; 701/22, 701/24
See application file for complete search history.

(56) References Cited

U.S. PATENT DOCUMENTS

| | | | |
|---|---|---|---|
| 8,456,095 B2 | 6/2013 | Huynh | |
| 8,542,509 B2 * | 9/2013 | Sagneri | H02M 3/158 363/69 |
| 9,047,075 B1 * | 6/2015 | Lee | H02J 9/061 |
| 2006/0285366 A1 * | 12/2006 | Radecker | H02M 3/33507 363/16 |
| 2011/0140622 A1 | 6/2011 | Suzuki | |
| 2012/0212276 A1 * | 8/2012 | Ziegler | H02M 1/4225 327/303 |
| 2012/0235481 A1 * | 9/2012 | Nakashima | H01M 14/005 307/26 |
| 2014/0012446 A1 * | 1/2014 | Kumar | B60W 20/00 701/22 |
| 2015/0097426 A1 * | 4/2015 | Yamane | B60L 50/40 307/10.1 |
| 2015/0098164 A1 * | 4/2015 | Lenig | H01H 9/56 361/185 |
| 2015/0380968 A1 * | 12/2015 | Lee | H02J 9/061 713/300 |
| 2016/0233560 A1 * | 8/2016 | Kanoh | H01M 10/425 |

FOREIGN PATENT DOCUMENTS

| | | | | |
|---|---|---|---|---|
| CN | 102687590 A | 9/2012 | | |
| EP | 2244364 A1 | 10/2010 | | |
| WO | 2005096679 A1 | 10/2005 | | |
| WO | 2008041153 A1 | 10/2005 | | |
| WO | 2010027254 A1 | 3/2010 | | |
| WO | 2012131592 A1 | 10/2012 | | |
| WO | WO-2012131592 A1 * | 10/2012 | | H05B 33/0821 |
| WO | WO-2012131592 A1 * | 10/2012 | | H05B 33/0821 |
| WO | 2014072847 A1 | 5/2014 | | |

OTHER PUBLICATIONS

Margery Conner, "AC-driver LED circuits: Electrolytic capacitors and flicker trade-offs", Nov. 20, 2012, pp. 1-4, www.designingwithleds.com/ac-driver-led-circuits-electrolytic-capacitors-flicker-trade-offs/.
ACS1404, Altoran Chip & Systems, Compact Direct AC Line LED Driver with high PF and low THD using Only Two External Components, pp. 1-13.
Texas Instruments, Floating Switching for Offline AC Linear direct Drive of LEDs with Low Ripple Current, SLUSBQ6, Oct. 2013.

* cited by examiner

DRIVER WITH AT LEAST FOUR DIFFERENT STATES

CROSS-REFERENCE TO PRIOR APPLICATIONS

This application is the U.S. National Phase application under 35 U.S.C. § 371 of International Application No. PCT/EP2016/054299, filed on Mar. 1, 2016 which claims the benefit of European Patent Application No. 15159318.3, filed on Mar. 17, 2015. These applications are hereby incorporated by reference herein.

FIELD OF THE INVENTION

The invention relates to a driver for driving a load circuit. The invention further relates to a device comprising a driver, and to a method for operating a driver. Examples of such a device are lamps.

BACKGROUND OF THE INVENTION

WO 2012/131592 A1 discloses a driver comprising a rectifier unit, a storage unit and a bridge switching unit. This driver has an excellent performance. It has three modes: the storage unit is bypassed, the storage unit is charged by the supply current, and the storage unit discharges via the load together with the supply current. However, certain regulations require a total harmonic distortion caused by the driver to be further reduced.

SUMMARY OF THE INVENTION

FIG. 8a shows the sinusoidal mains input voltage waveform and the block supply current waveform wherein a constant current source is at the load side. It has a power factor of 0.91 and a THD of 46.8%. The block supply current waveform distorts w.r.t. to the sinusoidal mains input voltage waveform a lot, thus the THD is relatively high. Additionally the power factor is can be improved even further.

It is an object of the invention to provide an improved driver. Such an improved driver for example shows a reduced total harmonic distortion. Further objects of the invention are to provide a device and an improved method.

A basic idea of the embodiments of the invention is providing another mode with a substantial time duration wherein the supply current is blocked/cut off to form a substantial zero supply current in the current waveform so as to deduce the THD. In order to provide a continuous load current, at this mode, the storage circuit still discharges via the load. FIG. 8b shows a supply current waveform with this blocked zero supply current, and the sinusoidal mains input voltage waveform. The PF and the THD improve to 0.96 and 27.7%.

According to a first aspect, a driver is provided for driving a load circuit, wherein the driver comprises
a supply circuit configured to provide a supply current signal from a mains source to the load circuit,
a storage circuit configured to store energy destined for the load circuit, and
a switch circuit coupled with the storage circuit, the load circuit and the supply circuit, and configured to switch coupling among the storage circuit, the load circuit and the supply circuit such that switching the storage circuit to be
charged via the supply current signal,
bypassed,
discharged via the load circuit together with the supply current signal, and
discharged via the load circuit at the same time the supply current signal through the mains source is blocked, which lasts for a substantial time duration.

A supply circuit provides a supply current signal to a load circuit, a storage circuit stores energy destined for the load circuit, and a switch circuit brings the driver into one of at least four possible states: In one of the states, the storage circuit is charged via the supply current signal that flows through the load circuit. In another one of the states, the switch circuit bypasses the storage circuit. In another one of the states, the storage circuit is discharged via the supply current signal that flows through the load circuit. In another one of the states, the storage circuit is discharged via the load circuit, not via the supply current signal.

In other words, the storage circuit can be discharged via the supply current signal whereby the load circuit is involved, and the storage circuit can be discharged via the load circuit whereby the supply current signal is not involved.

So, in addition to the usual states, a further state has been created wherein the storage circuit is discharged via the load circuit, not via the supply current signal. During this state, the load circuit is fed via the storage circuit, without the supply current signal being involved. As a result, a total harmonic distortion caused by the driver is further reduced. This is a great technical advantage.

An embodiment of the driver is defined wherein the switch circuit is configured to bring the driver into a charge state for said charging of the storage circuit via the supply current signal, into a bypass state for said bypassing of the storage circuit, into a dependent discharge state for said discharging of the storage circuit via the load circuit together with the supply current signal, and into an independent discharge state for said discharging of the storage circuit via the load circuit independently from the supply current signal which is blocked close to zero-crossings of the mains source when the supply voltage signal has a lowest level, wherein the substantial time duration of the independent discharge state is dependent on the supply current signal and desired value of total harmonic distortion.

In addition to the usual charge state, the usual bypass state and the usual dependent discharge state, an independent discharge state has been created wherein the storage circuit is discharged via the load circuit, and independently from the supply current signal. The discharging of the storage circuit via the load circuit, in other words the feeding of the load circuit via the storage circuit, independently from the supply current signal, is a great technical advantage of further reducing the THD.

An embodiment of the driver is defined wherein the supply circuit comprises a rectifier circuit that comprises first and second inputs configured to receive an alternating-current supply voltage signal from a source circuit, wherein the driver further comprises
a controller configured to control the switch circuit to bring the driver between two subsequent zero-crossings of the alternating-current supply voltage signal sequentially into the independent discharge state, the dependent discharge state, the bypass state, the charge state, the bypass state, the dependent discharge state and the independent discharge state, in this particular order.

The supply circuit comprises for example a rectifier circuit with first and second inputs that receive an alternating-current supply voltage signal from a source circuit, such as for example a 50 Hz or 60 Hz voltage signal coming from a mains source. The driver further comprises a controller for controlling the switch circuit such that, between two subsequent zero-crossings of the alternating-current supply voltage signal, the driver is brought into the independent discharge state, the dependent discharge state, the bypass state, the charge state, the bypass state, the dependent discharge state and the independent discharge state, in this particular order. Close to the zero-crossings, when the alternating-current supply voltage signal has lowest levels, the independent discharge state is introduced, wherein the storage circuit is discharged via the load circuit but independently from the supply current signal. In other words, when the alternating-current supply voltage signal has lowest levels, the load circuit is fed by discharging the storage circuit independently from the supply current signal. This is a great technical advantage.

Here it must be noted that said particular order may comprise more states than the ones listed already in case the voltage levels should require this. So, this list of sequent states is a minimal and non-exclusive list, more states may be present, each one of one of the kinds discussed. Other orders than said particular order are possible too and are not to be excluded.

An embodiment of the driver is defined wherein the supply circuit comprises a rectifier circuit that comprises first and second outputs configured to provide the supply current signal, wherein the storage circuit comprises a capacitor in a first branch, wherein the switch circuit comprises first and second switches in a second branch, wherein the switch circuit comprises third and fourth switches in a third branch, wherein the first, second and third branches are parallel branches, wherein the first output of the rectifier circuit is configured to be coupled to a first terminal of the load circuit, wherein first main contacts of the first and second switches are coupled to each other and are configured to be coupled to a second terminal of the load circuit, wherein first main contacts of the third and fourth switches are coupled to each other and to the second output of the rectifier circuit, and wherein the switch circuit comprises a fifth switch coupled to a second main contact of the first switch and configured to be coupled to the first terminal of the load circuit.

According to this simple, low cost and robust embodiment, the switch circuit comprises four switches as also disclosed in the bridge switching unit in WO 2012/131592 A1, and the switch circuit further comprises a fifth switch to allow the independent discharge state to be realized.

An embodiment of the driver is defined wherein the driver further comprises
a controller configured to control at least one of the switches in response to first information configured to be derived from a first instantaneous voltage difference present between the outputs of the rectifier circuit and in response to second information configured to be derived from a second instantaneous voltage difference present between contacts of the capacitor.

A controller controls at least one of the switches in response to first information derived from a first instantaneous voltage difference for example present between the outputs of the rectifier circuit and in response to second information derived from a second instantaneous voltage difference for example present across the capacitor. According to this simple, low cost and robust embodiment, the driver is brought into a proper state at a proper moment in time defined by one or more instantaneous voltage differences.

An embodiment of the driver is defined wherein the second and third switches each comprise a transistor, and wherein the second and third switches are non-conducting in the charge state, wherein one of the respective second and third switches is non-conducting and the other one is conducting in the bypass state, wherein the second and third switches are conducting in the dependent discharge state, and wherein the second switch is conducting and the third switch is non-conducting in the independent discharge state. According to this simple, low cost and robust embodiment, only two of the switches are in the form of transistors that need to be controlled. By controlling the second and third switches in the form of transistors, each state can be realized easily.

An embodiment of the driver is defined wherein the first, fourth and fifth switches each comprise a diode, wherein the first and fourth switches are conducting and the fifth switch is non-conducting in the charge state, wherein one of the respective first and fourth switches is conducting and the other one is non-conducting and the fifth switch is non-conducting in the bypass state, wherein the first, fourth and fifth switches are non-conducting in the dependent discharge state, and wherein the first and fourth switches are non-conducting and the fifth switch is conducting in the independent discharge state. According to this simple, low cost and robust embodiment, three of the switches are in the form of diodes that do not need to be controlled. In the charge state, the bypass state and the dependent discharge state, the fifth switch in the form of a diode is non-conducting, only in the independent discharge state, the fifth switch in the form of a diode is conducting.

An embodiment of the driver is defined wherein the switch circuit further comprises a sixth switch, and wherein the first output of the rectifier circuit is configured to be coupled to the first terminal of the load circuit via the sixth switch. According to this simple, low cost and robust embodiment, a sixth switch is introduced, for example to be able to measure the instantaneous voltage difference between the outputs of the rectifier circuit.

An embodiment of the driver is defined wherein the sixth switch comprises a diode. According to this simple, low cost and robust embodiment, the sixth switch is in the form of a diode that does not need to be controlled, for example to be able to measure the instantaneous voltage difference between the outputs of the rectifier circuit.

An embodiment of the driver is defined wherein the driver further comprises
a current regulator, wherein the first output of the rectifier circuit is configured to be coupled to the first terminal of the load circuit via the current regulator, or the first main contacts of the first and second switches are configured to be coupled to the second terminal of the load circuit via the current regulator, or the first main contacts of the third and fourth switches are coupled to the second output of the rectifier circuit via the current regulator, and
a controller configured to control the current regulator.

According to this embodiment, a current regulator in a serial branch located between the first and second outputs of the rectifier circuit regulates a value of a load current signal. This load current signal may be the supply current signal as provided by the rectifier circuit or may be a discharge current signal as provided by the capacitor in the independent discharge state. A controller controls an instantaneous value of the load current signal.

An embodiment of the driver is defined wherein the second switch or the third switch comprises a current regulator, and wherein the driver further comprises a controller configured to control the current regulator.

According to this embodiment, at least one of the second and third switches comprises a current regulator for regulating a value of a switch current signal that flows through the particular switch in the form of the current regulator. This switch current signal may be the supply current signal as provided by the rectifier circuit or may be a discharge current signal as provided by the capacitor in the independent discharge state. A controller controls an instantaneous value of the switch current signal.

An embodiment of the driver is defined wherein the driver further comprises
a current regulator that is configured to be coupled between
 the supply circuit and the load circuit or that is configured to be coupled between the load circuit and the switch circuit or that is coupled between the switch circuit and the supply circuit, and
a controller configured to control the current regulator.

According to this embodiment, a current regulator in a serial branch further comprising the load circuit regulates a value of a load current signal. This load current signal may be the supply current signal as provided by the rectifier circuit or may be a discharge current signal as provided by the capacitor in the independent discharge state. A controller controls an instantaneous value of the load current signal.

An embodiment of the driver is defined wherein the switch circuit comprises a current regulator, and wherein the driver further comprises
a controller configured to control the current regulator.

According to this embodiment, the switch circuit comprises a current regulator for regulating a value of a switch current signal that flows through (a part of) the switch circuit. This switch current signal may be the supply current signal as provided by the supply circuit or may be a discharge current signal as provided by the capacitor in the independent discharge state. A controller controls an instantaneous value of the switch current signal.

According to a second aspect, a device is provided comprising the driver, wherein the device further comprises the load circuit. The load circuit may for example comprise a light circuit. The light circuit may for example comprise a light emitting diode circuit that comprises one or more light emitting diodes of whatever kind and in whatever combination. The light circuit may for example comprise a tapped line LED that already comprises one or more current regulators discussed above or that is serially coupled to a current regulator discussed above.

According to a third aspect, a method is provided for operating a driver for driving a load circuit, wherein the driver comprises a supply circuit configured to provide a supply current signal to the load circuit and a storage circuit configured to store energy destined for the load circuit, wherein the method comprises the steps of
charging the storage circuit via the supply current signal,
bypassing the storage circuit,
discharging the storage circuit via the supply current signal, and
discharging the storage circuit via the load circuit.

Embodiments of the device and embodiments of the method correspond with the embodiments of the driver. The different embodiments of the driver can be combined arbitrarily.

A basic idea is that in a driver for driving a load circuit, a storage circuit is to be switched for charging it via a supply current signal, for bypassing it, for discharging it via the supply current signal, and for discharging it via the load circuit.

A problem to provide an improved driver that shows a reduced total harmonic distortion has been solved. A further advantage is that the driver may show an improved efficiency and that it can be simple, low cost and robust.

These and other aspects of the invention will be apparent from and elucidated with reference to the embodiments described hereinafter.

DETAILED DESCRIPTION OF EMBODIMENTS

Figure 1:
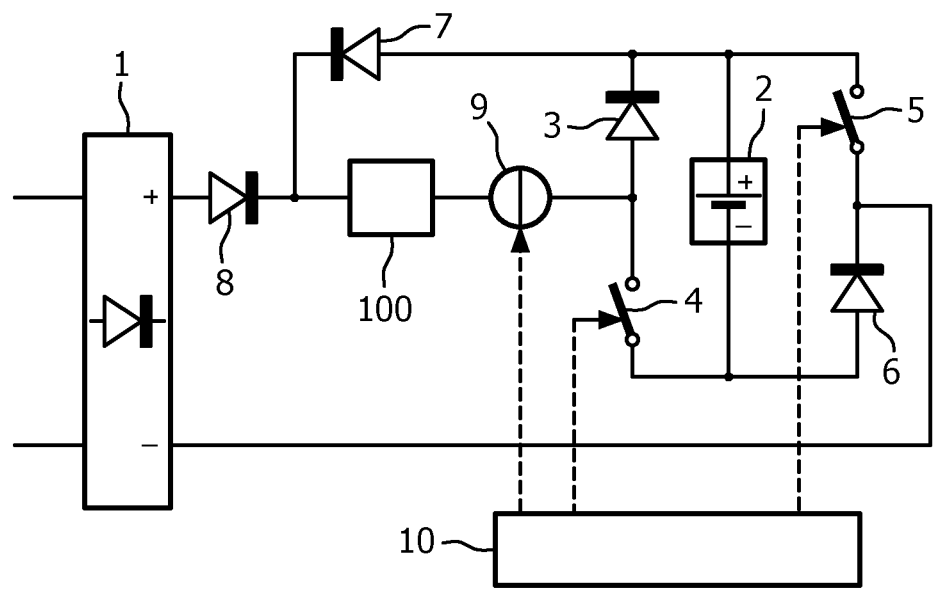
FIG. 1 shows an embodiment of a driver.

In the FIG. 1, an embodiment of a driver is shown. The driver 1-10 for driving a load circuit 100 comprises a supply circuit 1 for providing a supply current signal to the load circuit 100. The driver 1-10 further comprises a storage circuit 2 for storing energy destined for the load circuit 100, and a switch circuit 3-8 for switching the storage circuit 2. The switched storage circuit 2 is configured to be charged via the supply current signal, bypassed, discharged via the supply current signal, and discharged via the load circuit 100.

The switch circuit 3-8 may be configured to bring the driver 1-10 into a charge state for said charging of the storage circuit 2 via the supply current signal, into a bypass state for said bypassing of the storage circuit 2, into a dependent discharge state for said discharging of the storage circuit 2 via the supply current signal, and into an independent discharge state for said discharging of the storage circuit 2 via the load circuit 100 but independently from the supply current signal.

The supply circuit 1 may for example comprise a rectifier circuit such as for example a rectifier bridge that comprises first and second inputs for receiving an alternating-current supply voltage signal from a source circuit not shown. The driver 1-10 may further comprise a controller 10 for controlling the switch circuit 3-8. The controlled switch circuit 3-8 may be configured to bring the driver 1-10 between two subsequent zero-crossings of the alternating-current supply voltage signal into the independent discharge state, the dependent discharge state, the bypass state, the charge state, the bypass state, the dependent discharge state and the independent discharge state, in this particular order, whereby additional states are not to be excluded, each one of one of the four kinds as discussed. But other orders than said particular order are possible too and are not to be excluded.

The rectifier circuit such as for example the rectifier bridge may comprise first (positive) and second (negative) outputs for providing the supply current signal to the load circuit 100. The storage circuit 2 may for example comprise a single capacitor of whatever kind in a first branch. But two or more capacitors of whatever kind and in whatever combination are not to be excluded. The switch circuit 3-8 may for example comprise first and second switches 3, 4 in a second branch, and may for example comprise third and fourth switches 5, 6 in a third branch. The first, second and third branches may be parallel branches. The first output of the rectifier circuit may be configured to be coupled to a first terminal of the load circuit 100. First main contacts of the first and second switches 3, 4 may be coupled to each other and may be configured to be coupled to a second terminal of the load circuit 100. First main contacts of the third and fourth switches 5, 6 may be coupled to each other and to the second output of the rectifier circuit.

The switch circuit 3-8 may for example comprise a fifth switch 7 that may be coupled to a second main contact of the first switch 3 and that may be configured to be coupled to the first terminal of the load circuit 100. The controller 10 may be further configured to control at least one of the switches 3-7. The switch circuit 3-8 may for example further comprise a sixth switch 8. The first output of the rectifier circuit may be configured to be coupled to the first terminal of the load circuit 100 via the sixth switch 8.

The driver 1-10 may further comprise a current regulator 9. The first output of the rectifier circuit may be configured to be coupled to the first terminal of the load circuit 100 via the current regulator 9 (not shown), or the first main contacts of the first and second switches 3, 4 may be configured to be coupled to the second terminal of the load circuit 100 via the current regulator 9 (as shown), or the first main contacts of the third and fourth switches 5, 6 may be coupled to the second output of the rectifier circuit via the current regulator 9 (not shown). The controller 10 may be further configured to control the current regulator 9.

Each one of the six switches 3-8 may be any kind of switch. According to a preferred embodiment, the second and third switches 4, 5 may each comprise a transistor of whatever kind. The second and third switches 4, 5 may be non-conducting in the charge state. One of the respective second and third switches 4, 5 (for "respective" see also the switches 3, 6) may be non-conducting and the other one may be conducting in the bypass state. The second and third switches 4, 5 may be conducting in the dependent discharge state. The second switch 4 may be conducting and the third switch 5 may be non-conducting in the independent discharge state.

According to the preferred embodiment, the first, fourth, fifth and sixth switches 3, 6, 7, 8 may each comprise a diode, as shown. The first and fourth and sixth switches 3, 6, 8 may be conducting and the fifth switch 7 may be non-conducting in the charge state. One of the respective first and fourth switches 3, 6 may be conducting and the other one may be non-conducting (for "respective" see also the switches 4, 5) and the fifth switch 7 may be non-conducting and the sixth switch 8 may be conducting in the bypass state. The first, fourth and fifth switches 3, 6, 7 may be non-conducting and the sixth switch 8 may be conducting in the dependent discharge state. The first and fourth and sixth switches 3, 6, 8 may be non-conducting and the fifth switch 7 may be conducting in the independent discharge state. These states will be discussed in greater detail in view of the FIG. 3-6.

In the FIG. 1, the first main contact of the first switch 3 is an anode. A cathode of the first switch 3 is coupled to an anode of the fifth switch 7. A cathode of the fifth switch 7 is coupled to a cathode of the sixth switch 8 and configured to be coupled to the first terminal of the load circuit 100. An anode of the sixth switch 8 is coupled to the first output of the rectifier circuit. In the FIG. 1, the first main contact of the fourth switch 6 is a cathode. But other kinds of contacts and other kinds of polarities will be possible too.

Figure 2:
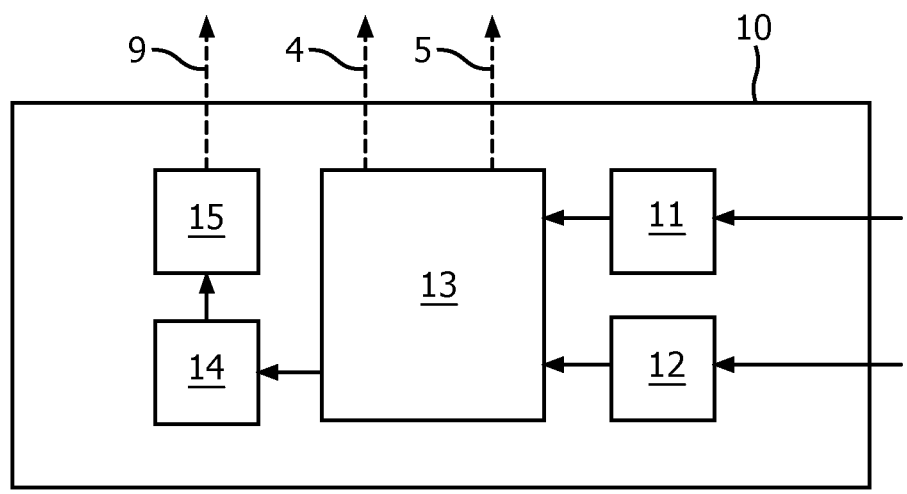
FIG. 2 shows an embodiment of a controller.

In the FIG. 2, an embodiment of a controller is shown. The controller 10 may for example be configured to control (at least a part of) the switch circuit 3-8 and/or to control (one or more of) the switches 3-8. Said controlling may be done in response to first information configured to be derived from a first instantaneous voltage difference present between the outputs of the rectifier circuit and in response to second information configured to be derived from a second instantaneous voltage difference present between the contacts of the capacitor. Thereto, the controller 10 may comprise a first voltage divider 11 with an input to be coupled to the first output of the rectifier circuit and a second voltage divider 12 with an input to be coupled to a positive contact of the capacitor. Outputs of the voltage dividers 11, 12 are coupled to inputs of a processor 13 such as for example a microcontroller. First and second outputs of the processor 13 are used for controlling the second and third switches 4 and 5, if necessary via for example a level shifter or an optical coupler not shown, dependent on a choice of a reference terminal of the processor 13, and a third output of the processor 13 is coupled via for example an optical-coupler 14 or via a level shifter not shown to a buffer/filter 15 for controlling the current regulator 9. A voltage reference terminal of the first voltage divider 11, of the second voltage divider 12 and of the processor 13 may be the negative contact of the capacitor, without having excluded other voltage reference terminals.

Figure 3:
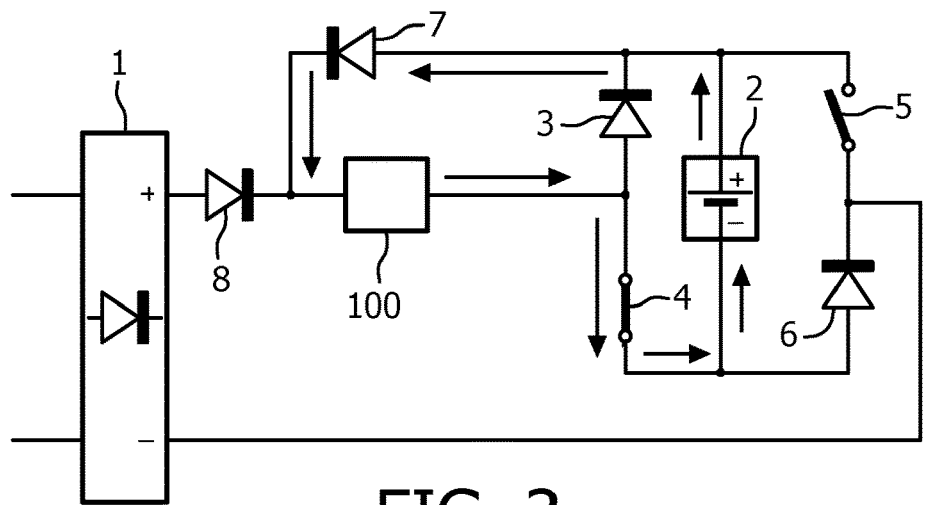
FIG. 3 shows an independent discharge state.

In the FIG. 3, an independent discharge state is shown. In this state, the switch 3 is non-conducting, the switch 4 is conducting (so the switch 3 is reversely biased by the voltage difference present across the capacitor), the switch 5 is non-conducting, the switch 7 is conducting and at least one of the switches 6 and 8 is non-conducting, whereby the supply current signal is blocked. In this case, the capacitor is discharged via the switch 7, the load circuit 100 and the switch 4, independently from the supply current signal. In this mode, Characteristics of the fourth mode are:
 continuous load current
 Energy is delivered by the storage element: $I_C = -I_L$
 supply current at the input side of the bridge rectifier, which couples to the AC source, is substantially zero.
 and to allow continuous load current (and storage capacitor current) while the supply current is zero, extra elements are used and in this embodiment those are diodes 7 and 8.

Figure 4:
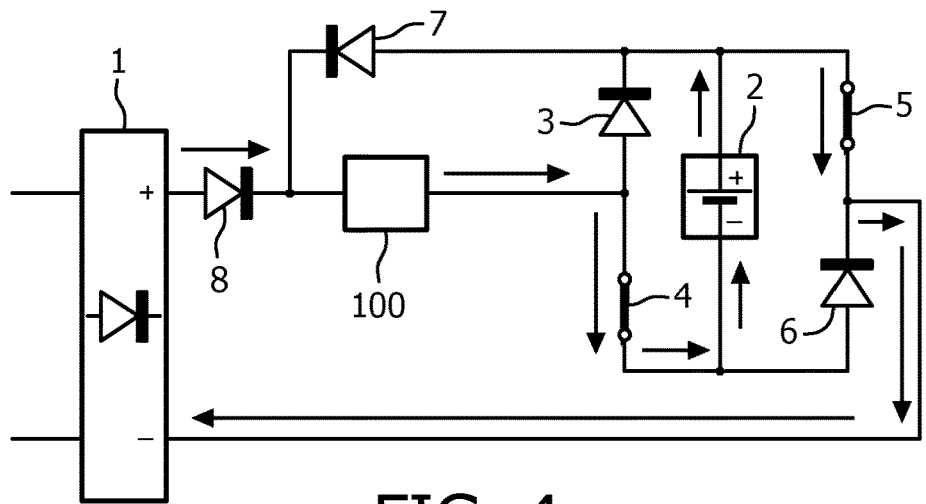
FIG. 4 shows a dependent discharge state.

In the FIG. 4, a dependent discharge state is shown. In this state, the switch 3 is non-conducting, the switch 4 is conducting (so the switch 3 is reversely biased by the voltage difference present across the capacitor), the switch 5 is conducting, the switches 6 and 7 are non-conducting and the switch 8 is conducting, whereby the supply current signal is not blocked. In this case, the capacitor is discharged (owing to the fact that the current signal flows through the capacitor from its negative contact to its positive contact) via the switch 5, the rectifier circuit, the switch 8, the load circuit 100 and the switch 4, while using the supply current signal.

Figure 5:
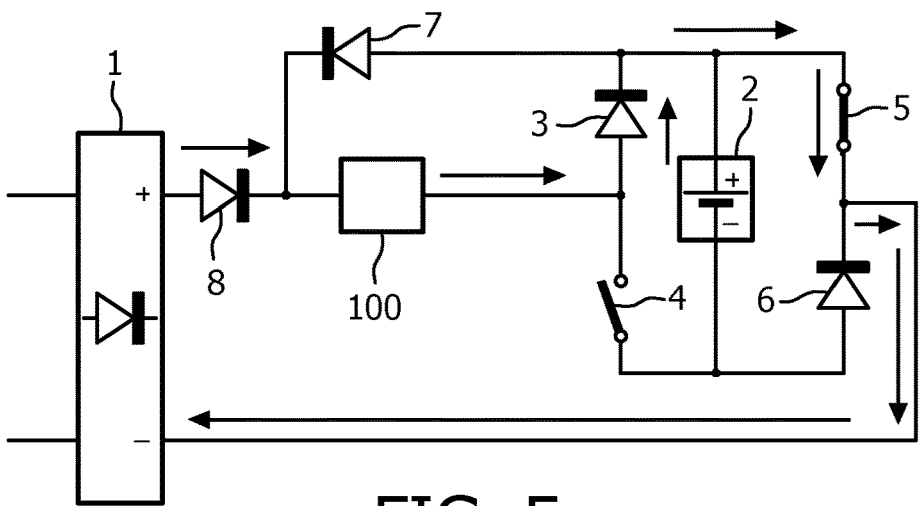
FIG. 5 shows a bypass state.

In the FIG. 5, a bypass state is shown. In this state, the switch 3 is conducting, the switch 4 is non-conducting, the switch 5 is conducting, the switches 6 and 7 are non-conducting and the switch 8 is conducting, whereby the supply current signal is not blocked. In this case, the capacitor is bypassed and the supply current signal flows from the rectifier circuit via the switch 8, the load circuit 100, the switch 3 and the switch 5 back to the rectifier circuit, while ignoring the capacitor. The bypass state shown is a so-called top-bypass state. Clearly, alternatively, a bottom-bypass state may be created, wherein the switches 3 and 5 are non-conducting and the switches 4 and 6 are conducting.

Figure 6:
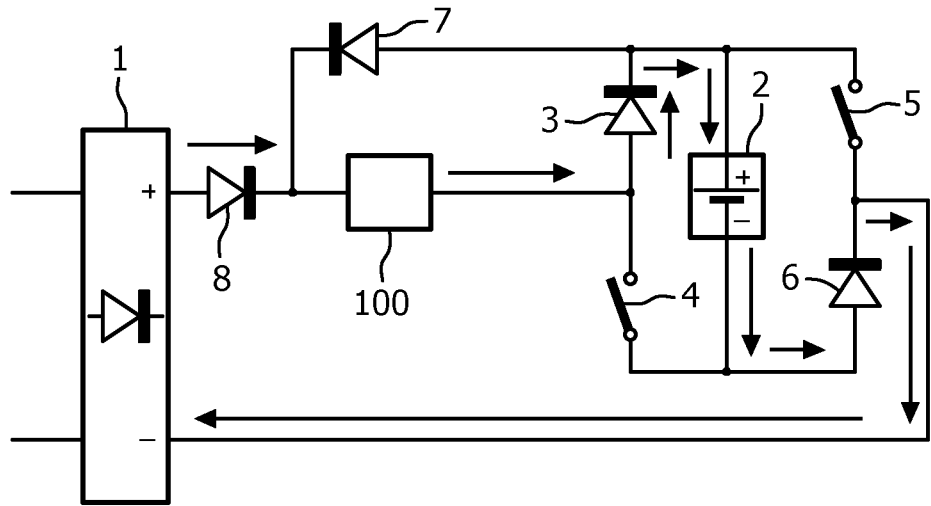
FIG. 6 shows a charge state.

In the FIG. 6, a charge state is shown. In this state, the switch 3 is conducting, the switch 4 is non-conducting, the switch 5 is non-conducting, the switch 6 is conducting, the switch 7 is non-conducting and the switch 8 is conducting, whereby the supply current signal is not blocked. In this case, the capacitor is charged (owing to the fact that the current signal flows through the capacitor from its positive contact to its negative contact) via the switch 6, the rectifier circuit, the switch 8, the load circuit 100 and the switch 3, while using the supply current signal.

Preferably, between two subsequent zero-crossings of the alternating-current supply voltage signal as supplied to the inputs of the rectifier circuit, the driver 1-10 may be brought into the independent discharge state (FIG. 3), the dependent discharge state (FIG. 4), the bypass state (FIG. 5), the charge state (FIG. 6), the bypass state (FIG. 5), the dependent discharge state (FIG. 4) and the independent discharge state (FIG. 3), in this particular order, whereby additional states are not to be excluded, each one of one of the four kinds as discussed. Other orders than said particular order are not to be excluded. In the charge state, the capacitor is charged such that during the discharge states sufficient amounts of charge remain present to be able to be discharged.

Generally, in the second (third) branch, in case one of the switches 3, 4 (5, 6) is conducting, the other one is non-conducting, and vice versa. Generally, the fact that a switch 3, 5, 7, 8 in the form of a diode is conducting (forward biased) or non-conducting (reverse biased) depends on the voltage environment, and this voltage environment depends on the way a switch 4, 5 in the form of a transistor is switched. Generally, a voltage difference present across the capacitor will be larger than a forward bias voltage value of a diode in a normal situation. In the FIG. 3-6, the current regulator 9 has been left out, for the sake of clarity. Generally, such a current regulator 9 increases a number of control options.

Similarly, the second (third) switch 4 (5) may comprise a current regulator (not shown), and the switch circuit 3-8 may comprise a current regulator (not shown), whereby the controller 10 may be configured to control this current regulator. Again, such a current regulator increases a number of control options. More than one current regulator may be introduced. Even a switch 3, 6 in the form of a diode may be realized through a current regulator, for example to be able to regulate the supply current signal in the charge state. In the charge state, the switches 4 and 5 are non-conducting and therefore in an offside position. Alternatively, to be able to regulate the supply current signal in the charge state, a current regulator may be inserted into the first branch serially to the capacitor.

Figure 7:
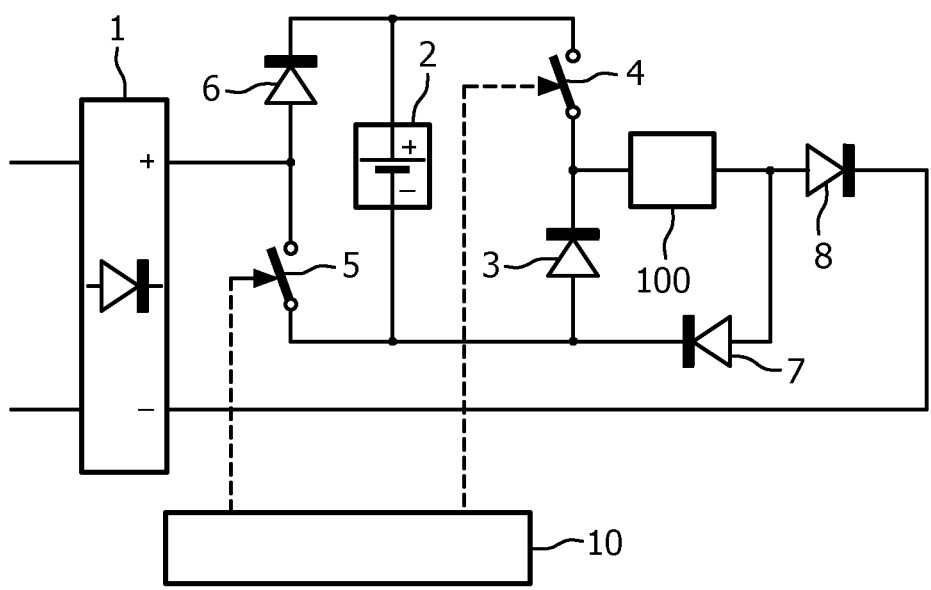
FIG. 7 shows another embodiment of a driver.
Figure 8A:
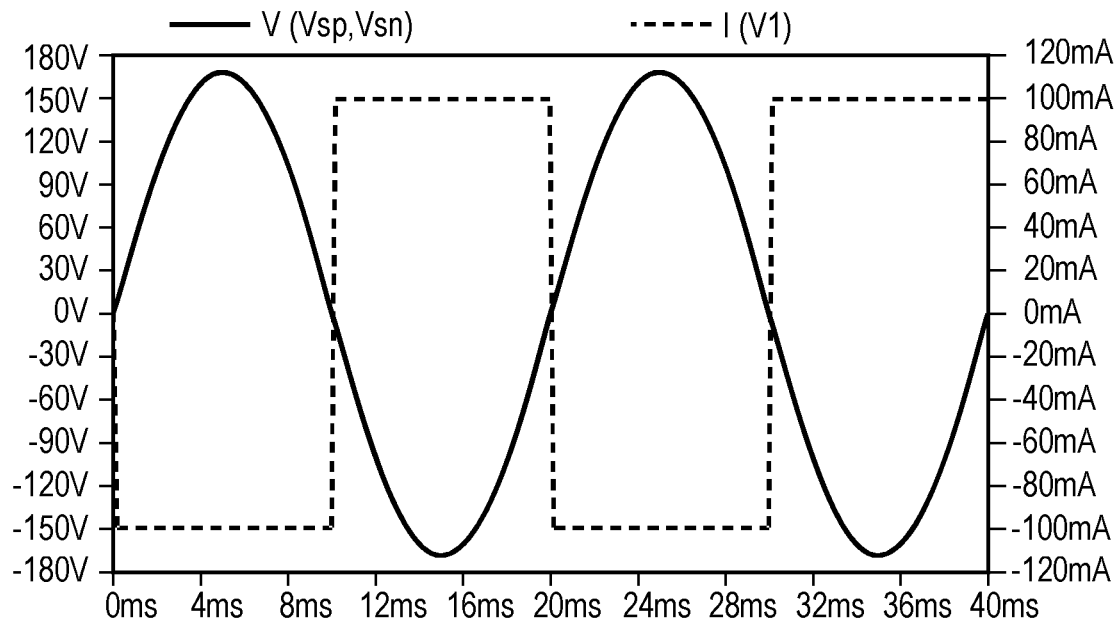
FIG. 8a shows the supply current and supply voltage waveform wherein the supply current is not blocked.
Figure 8B:
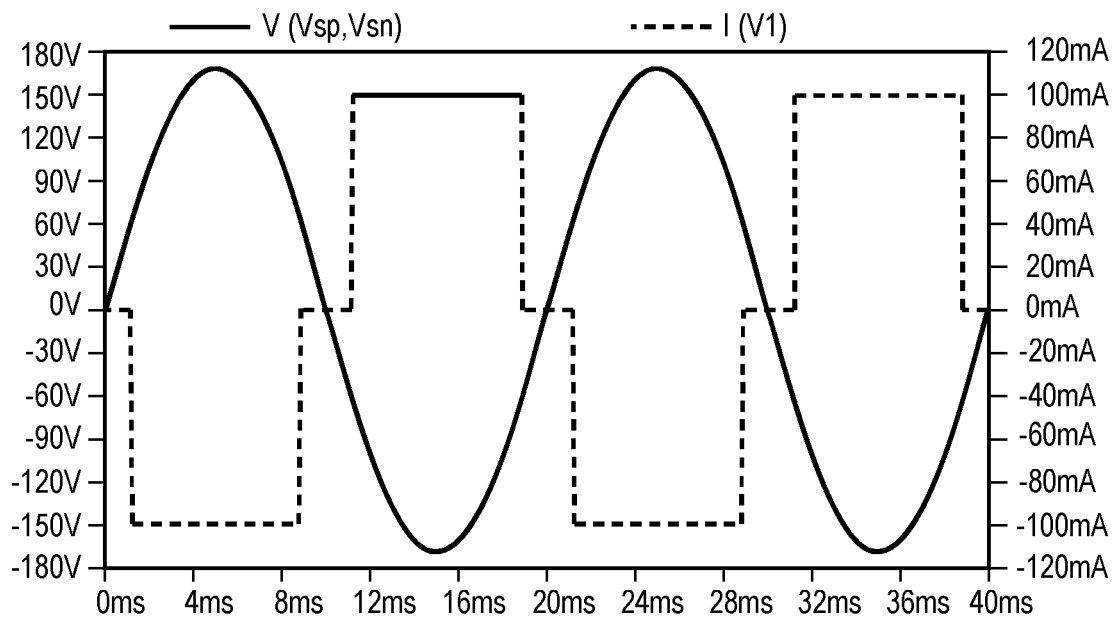
FIG. 8b shows the supply current and supply voltage waveform wherein the supply current is blocked for a substantial time duration according to an embodiment of the invention.

In the FIG. 7, another embodiment of a driver is shown. This embodiment differs from the one shown in the FIG. 1 in that the current regulator 9 has been left out and in that the load circuit 100 and the switches 7 and 8 are here located at a right side of the capacitor, where in the FIG. 1 they are located at a left side of the capacitor.

First and second elements can be coupled indirectly via a third element and can be coupled directly without the third element being in between. The processor 13 may use a formula or a look-up table to shape the supply current signal to create a desired current waveform. Experiments have shown that a total harmonic distortion below 20% and a flicker index below 0.1 are possible in a simple, low cost and robust environment.

The mains current can be simply modulated by the following equation $$I_{SET}=I_{DC}(a+(1-a)\times\sin(2\pi ft))$$

wherein a is a real value between 0 and 1, and f is the mains frequency. It can be regarded as the sum of a sinusoidal component plus a DC content.

The rationale behind the above equation is that if a is 0, then the power available to the load is a pure sine wave. The higher the DC content is (when a approaches 1 in the equation), the higher LED utilization will be. However having a high DC content will result in a high THD. In the case of the EU mains 220V AC, it can be calculated that when a is 0.5, the THD is 26.4%. By cutting off part of the mains current around the zero crossing, the THD can be brought down again. The duration of the blocked supply current cannot be too long or too short. The cut-off threshold can be for example determined to be 90V for the EU mains, and in this case the THD can be brought down to 18.3%. Alternatively, the cut-off threshold can be for example determined to be 45 volts for the US mains 110V AC.

Figure 9:
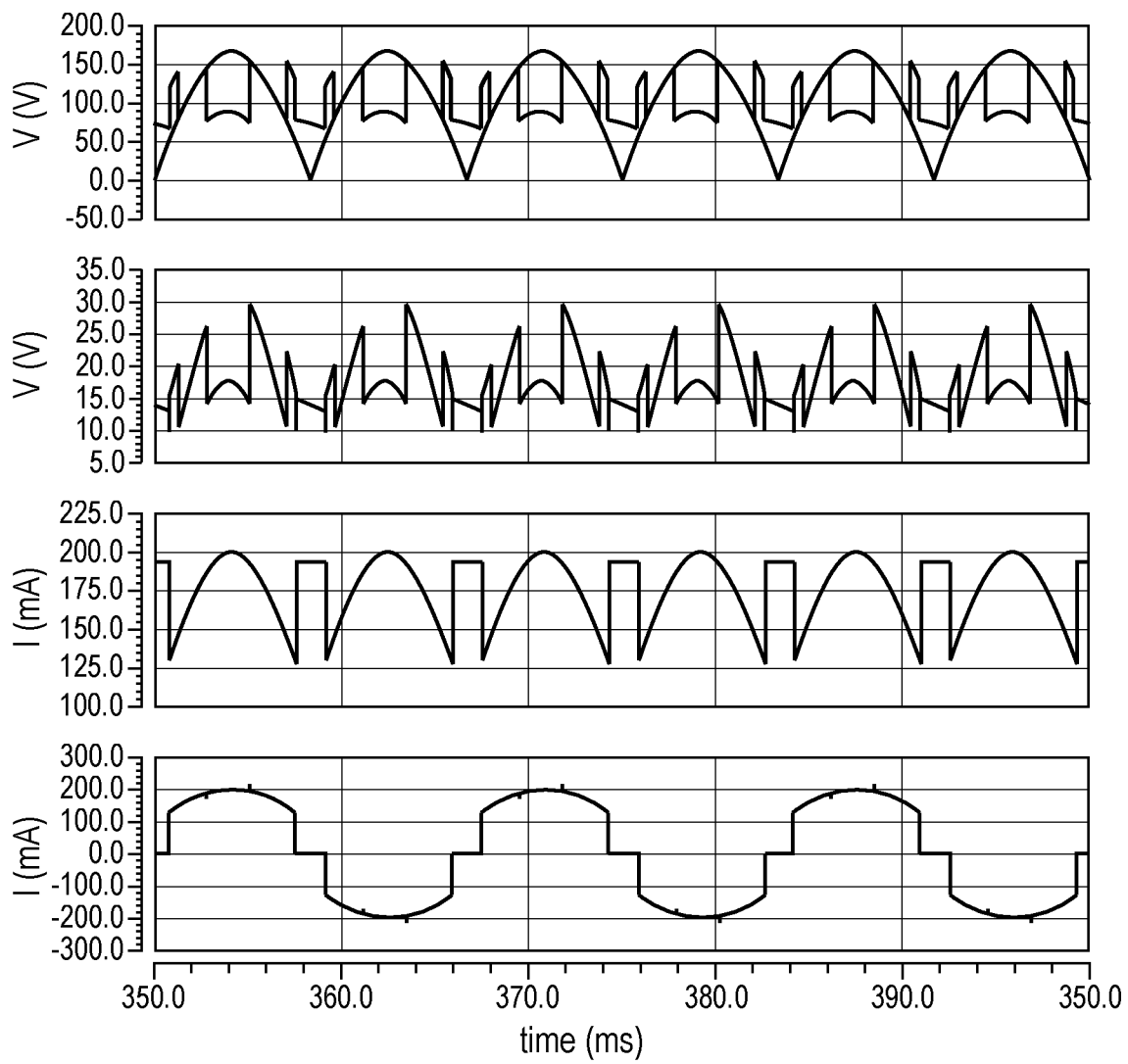
FIG. 9 shows a waveform according to an embodiment of the invention.

FIG. 9 shows the waveforms of an embodiment according to the invention. In the first row, the sinusoidal waveform is the rectified mains input voltage, and the other waveform is the load voltage; the second row shows the load power; the third row shows the load current and the fourth row shows the mains supply current. By comparing the load current and the mains supply current, it can be seen that the mains supply current is blocked as zero but the capacitor still discharges via the load circuit, near the zero crossing of the mains input voltage.

Summarizing, drivers 1-10 for driving load circuits 100 comprise supply circuits 1 for providing supply current signals to the load circuits 100, storage circuits 2 for storing energy destined for the load circuits 100, and switch circuits 3-8 for switching the storage circuits 2. The switched storage circuits 2 can, in charge states, be charged via the supply current signals, and in bypass states be bypassed, and in dependent discharge states be discharged via the supply current signals, and in independent discharge states be discharged via the load circuits 100 independently from the supply current signals. The drivers 1-10 may further comprise controllers 10 for controlling the switch circuits 3-8 for bringing the drivers 1-10 between two subsequent zero-crossings of signals supplied to the supply circuits 1 into the independent discharge state, the dependent discharge state, the bypass state, the charge state, the bypass state, the dependent discharge state and the independent discharge state, in this particular order. These drivers 1-10 show a reduced total harmonic distortion.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these mea-

The invention claimed is:

1. A driver for driving a load circuit, wherein the driver comprises
   a supply circuit configured to provide a supply current signal from a mains source to the load circuit,
   a storage circuit configured to store energy destined for the load circuit,
   a switch circuit coupled with the storage circuit and the supply circuit, wherein the switch circuit is configured to be coupled with the load circuit
   a controller for controlling the switch circuit, wherein when the switch circuit is coupled to the load circuit, the controller is configured to control the switch circuit to bring the driver into
      a charge state for charging the storage circuit via the supply current signal;
      a bypass state for bypassing the storage circuit;
      dependent discharge state for discharging of the storage circuit via the load circuit, whereby the supply current is not blocked; and
   wherein the controller is further configured to control the switch circuit to bring the driver into an independent discharge state for discharging the storage circuit via the load circuit, whereby the supply current signal is blocked for a time duration.

2. The driver as defined in claim 1, wherein the supply current signal is blocked close to zero-crossings of the mains source when the supply voltage signal has a lowest level, wherein the a time duration of the independent discharge state is dependent on the supply current signal and desired value of total harmonic distortion.

3. The driver as defined in claim 2, wherein the supply circuit comprises a rectifier circuit that comprises first and second inputs configured to receive an alternating-current supply voltage signal from a source circuit, wherein the controller is configured to control the switch circuit to bring the driver between two subsequent zero-crossings of the alternating-current supply voltage signal sequentially into the independent discharge state, the dependent discharge state, the bypass state, the charge state, the bypass state, the dependent discharge state and the independent discharge state;
   wherein the controller is configured to control the switch circuit to bring the driver in the independent discharge state when an instant supply voltage at the source circuit is below:
      the lowest level of around 90 volts, in case a mean supply voltage being around 220 volts AC;
      the lowest level of around 45 volts, in case a mean supply voltage being around 110 volts AC.

4. The driver as defined in claim 2, wherein the supply circuit comprises a rectifier circuit that comprises first and second outputs configured to provide the supply current signal, wherein the storage circuit comprises a capacitor in a first branch, wherein the switch circuit comprises first and second switches in a second branch, wherein the switch circuit comprises third and fourth switches in a third branch, wherein the first, second and third branches are parallel branches, wherein the first output of the rectifier circuit is configured to be coupled to a first terminal of the load circuit, wherein first main contacts of the first and second switches are coupled to each other and are configured to be coupled to a second terminal of the load circuit, wherein first main contacts of the third and fourth switches are coupled to each other and to the second output of the rectifier circuit, and wherein the switch circuit comprises a fifth switch coupled to a second main contact of the first switch and configured to be coupled to the first terminal of the load circuit.

5. The driver as defined in claim 4, wherein the controller is
   configured to control at least one of the switches in response to first information configured to be derived from a first instantaneous voltage difference present between the outputs of the rectifier circuit and in response to second information configured to be derived from a second instantaneous voltage difference present between contacts of the capacitor.

6. The driver as defined in claim 4, wherein the second and third switches each comprise a transistor, and wherein the second and third switches are non-conducting in the charge state, wherein one of the respective second and third switches is non-conducting and the other one is conducting in the bypass state, wherein the second and third switches are conducting in the dependent discharge state, and wherein the second switch is conducting and the third switch is non-conducting in the independent discharge state.

7. The driver as defined in claim 4, wherein the first, fourth and fifth switches each comprise a diode, wherein the first and fourth switches are conducting and the fifth switch is non-conducting in the charge state, wherein one of the respective first and fourth switches is conducting and the other one is non-conducting and the fifth switch is non-conducting in the bypass state, wherein the first, fourth and fifth switches are non-conducting in the dependent discharge state, and wherein the first and fourth switches are non-conducting and the fifth switch is conducting in the independent discharge state.

8. The driver as defined in claim 4, wherein the switch circuit further comprises a sixth switch, and wherein the first output of the rectifier circuit is configured to be coupled to the first terminal of the load circuit via the sixth switch.

9. The driver as defined in claim 8, wherein the sixth switch comprises a diode.

10. The driver as defined in claim 4, wherein the driver further comprises
    a current regulator, wherein the first output of the rectifier circuit is configured to be coupled to the first terminal of the load circuit via the current regulator, or the first main contacts of the first and second switches are configured to be coupled to the second terminal of the load circuit via the current regulator, or the first main contacts of the third and fourth switches are coupled to the second output of the rectifier circuit via the current regulator, and wherein the controller configured to control the current regulator.

11. The driver as defined in claim 4, wherein the second switch or the third switch comprises a current regulator, and wherein the controller is configured to control the current regulator.

12. The driver as defined in claim 1, wherein the driver further comprises
    a current regulator that is configured to be coupled between the supply circuit and the load circuit or that is configured to be coupled between the load circuit and the switch circuit or that is coupled between the switch circuit and the supply circuit, and the controller is configured to control the current regulator.

13. The driver as defined in claim 1, wherein the switch circuit comprises a current regulator, and wherein the controller is configured to control the current regulator.

14. A device comprising the driver as defined in claim 1, wherein the device further comprises the load circuit.

15. A method for operating a driver for driving a load circuit, wherein the driver comprises a supply circuit configured to provide a supply current signal to the load circuit and a storage circuit configured to store energy destined for the load circuit, wherein the method comprises the steps of
  charging the storage circuit via the supply current signal,
  bypassing the storage circuit,
  discharging the storage circuit via the load circuit, whereby the supply current is not blocked, and
  discharging the storage circuit via the load circuit whereby the supply current signal is blocked for a time duration.

* * * * *